No. 732,605. Patented June 30, 1903.

UNITED STATES PATENT OFFICE.

GUSTAV E. THEDE, OF HAVILAH, CALIFORNIA.

PROCESS OF LEACHING ORES.

SPECIFICATION forming part of Letters Patent No. 732,605, dated June 30, 1903.

Application filed November 18, 1902. Serial No. 131,888. (No specimens.)

*To all whom it may concern:*

Be it known that I, GUSTAV E. THEDE, a citizen of the United States, residing at Havilah, county of Kern, State of California, have invented an Improvement in Processes of Leaching Ores; and I hereby declare the following to be a full, clear, and exact description of the same.

My invention relates to improvements in the art of leaching ores with solutions of alkaline cyanids; and its object is to increase the solvent power of such solutions by the generation of oxygen in a nascent state as it is needed in the leaching-tank and within the charge of ore or tailings, effecting an economy of material and a saving of time in working each charge of ore or tailings and also increasing the percentage of extraction.

I have found that where ore or tailings mixed with certain substances capable of giving up their oxygen in a nascent state when brought into contact with peroxid of hydrogen (or dioxid of hydrogen, $H_2O_2$) contained in the cyanid solution, and which substances also at the same time react to slowly decompose the $H_2O_2$ into oxygen and water, the reduction of the ore or tailings is greatly facilitated and improved than where $H_2O_2$ is used without such substances.

As examples of substances having the qualities of being reduced in the presence of $H_2O_2$ and of reacting as described upon the latter may be mentioned the metallic oxids, such as ferric oxid, manganese dioxid, silver oxid, mercuric oxid, &c. It is the combination of such a reducible and reducing agent with a cyanid solution containing peroxid of hydrogen, whereby nascent oxygen is generated throughout the charge, that I claim as my discovery. Where $H_2O_2$ is mixed with ore from which such reducible oxids are absent, all the benefit of the $H_2O_2$ in increasing the solvent power of the KCy solution is derived only through its slow decomposition into $H_2O$ and O.

With my process I mix with the ore the KCy and the $H_2O_2$ some substance capable of giving up oxygen itself in contact with $H_2O_2$. In other words, I do not depend on the slow decomposition of the $H_2O_2$ by itself to supply oxygen to the KCy solution, but on the quality of the substance—*e. g.*, a metallic oxid—to decompose oxids—*i. e.*, $H_2O_2$—in the ore charge and to become itself decomposed by such oxids.

Experience shows that the rapid dissolution of the gold is accomplished by the generation of oxygen in close proximity to each gold particle, and this is due to the fact of the reduction of the oxids all through the charge and of the $H_2O_2$ all through the solution.

The quantity of the reducible oxid is immaterial as long as there is enough to use up the $H_2O_2$ present in the solution. As a general rule the more of the metallic oxid the better. It may be said that the ore to be treated should contain not less than .05 per cent. of such reducible oxid (the equivalent of one pound of oxid to one ton of ore) and should be thoroughly intermingled with it prior to the addition of the KCy and $H_2O_2$ solution.

The peculiar advantage of my process is in the matter of economy and increased effectiveness, as the oxygen is generated in contact with the ore particles in a nascent state and more slowly and in such a way more as it is needed while the dissolution of the precious metal by the cyanid solution goes on, so that little, if any, of the oxygen will become lost by escaping into the air, provided the quantity of the $H_2O_2$ is regulated properly.

In practice I use from two ounces upward of a four-and-one-half-per-cent. solution $H_2O_2$ per ton of cyanid solution needed to soak or saturate the charge of ore or tailings. As soon as the mixture is run onto the ore charge oxygen will at once begin to permeate the whole charge slowly and evenly in a nascent state and will keep forming for a sufficient period of time to supply the cyanid solution with oxygen to dissolve the precious metal.

The recovery of the values from the solution is effected in the usual manner.

Having thus described my invention, what I claim, and desire to secure by Letters Patent, is—

1. The process of leaching ores which consists of mixing with the ore a metallic oxid, and treating said mixture in a cyanid solution containing an oxid capable of reducing said metallic oxid.

2. The process of extracting precious metals from their ores which consists in treating the ore in the presence of a cyanid solution, peroxid of hydrogen and a substance or substances capable of parting with oxygen in contact with the peroxid of hydrogen.

3. The herein-described process of leaching ores which consists in mixing with the ore to be treated, a cyanid solution, peroxid of hydrogen and an oxid which is reducible by said peroxid of hydrogen.

4. The process of extracting precious metals from their ores consisting in mixing the ore with a suitable metallic oxid and treating in a cyanid solution containing peroxid of hydrogen.

In witness whereof I have hereunto set my hand.

GUSTAV E. THEDE.

Witnesses:
FRANK P. COCHRAN,
W. H. RYAN.